United States Patent
Takahashi et al.

(10) Patent No.: US 9,250,802 B2
(45) Date of Patent: Feb. 2, 2016

(54) SHAPING DEVICE

(71) Applicant: KABUSHIKI KAISHA TOSHIBA, Minato-ku, Tokyo (JP)

(72) Inventors: Shihomi Takahashi, Yokohama (JP); Tomoyuki Shibata, Kawasaki (JP); Kazunori Imoto, Kawasaki (JP); Yasunobu Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 143 days.

(21) Appl. No.: 14/197,657

(22) Filed: Mar. 5, 2014

(65) Prior Publication Data
US 2014/0285425 A1     Sep. 25, 2014

(30) Foreign Application Priority Data
Mar. 25, 2013   (JP) .................. 2013-062970

(51) Int. Cl.
  *G06K 9/00* (2006.01)
  *G06F 3/0488* (2013.01)
(52) U.S. Cl.
  CPC .................. *G06F 3/04883* (2013.01)
(58) Field of Classification Search
  USPC ......... 382/170, 186, 178, 190, 209; 358/1.11, 358/537, 538, 462
  See application file for complete search history.

(56) References Cited

U.S. PATENT DOCUMENTS

| | | | | |
|---|---|---|---|---|
| 6,600,834 B1 * | 7/2003 | Su | ............ | G06K 9/222 382/177 |
| 7,302,099 B2 * | 11/2007 | Zhang | ............ | G06K 9/222 382/185 |
| 7,756,337 B2 * | 7/2010 | Chen | ............ | G06K 9/222 382/185 |
| 7,912,700 B2 * | 3/2011 | Bower | ............ | G06F 3/0237 704/1 |
| 8,050,500 B1 * | 11/2011 | Batty | ............ | G06K 9/00429 382/181 |
| 8,326,040 B2 * | 12/2012 | Zhang | ............ | G06K 9/00422 382/155 |
| 8,510,311 B2 | 8/2013 | Shibata et al. | | |
| 8,615,131 B2 * | 12/2013 | El-Sana | ............ | G06K 9/00402 382/159 |

FOREIGN PATENT DOCUMENTS

JP        58-181181 A      10/1983

OTHER PUBLICATIONS

Koby Crammer, et al., "On the Algorithmic Implementation of Multiclass Kernel-based Vector Machines," Journal of Machine Learning Research 2, pp. 265-292, 2001.

(Continued)

*Primary Examiner* — Yosef Kassa
(74) *Attorney, Agent, or Firm* — Knobbe, Martens Olson & Bear LLP

(57) ABSTRACT

According to an embodiment, a shaping device includes an acquiring unit, an extracting unit, first and second calculators, a determining unit, a shaping unit, and a display unit. The acquiring unit is configured to acquire strokes handwritten by a user. The extracting unit is configured to extract multiple combinations of strokes. The first calculator is configured to calculate a first likelihood representing a probability that each combination related to a target graphic. The second calculator is configured to calculate a second likelihood representing a probability that each combination related to an incomplete shape. The determining unit is configured to determine whether there is a first combination having first likelihood not less than a first threshold and the second likelihood not more than a second threshold. The shaping unit is configured to shape the strokes into the target graphic. The display unit is configured to display a result of shaping.

9 Claims, 15 Drawing Sheets

(56) References Cited

OTHER PUBLICATIONS

Xiang-Dong Zhou, et al., "Text/Non-text Ink Stroke Classification in Japanese Handwriting Based on Markov Random Fields," Document Analysis and Recognition, 2007, ICDAR 2007, Ninth International Conference on Sep. 23-26, 2007, pp. 1-5.

Background Art Information, Toshiba, Jun. 13, 2013.

* cited by examiner

| COMBINATION OF STROKES | FIRST LIKELIHOOD ||||SECOND LIKELIHOOD |
|---|---|---|---|---|---|
| | CIRCLE | RECTANGLE | DATABASE | ... | |
| 0 | 1.0 | 0.3 | 0.0 | | 1.0 |
| 0, 1 | 0.0 | 0.3 | 0.3 | | 0.8 |
| 0, 1, 2 | 0.0 | 0.3 | 0.6 | | 0.8 |
| 0, 1, 2, 3 | 0.0 | 0.5 | 0.9 | | 0.0 |

| COMBINATION OF STROKES | FIRST LIKELIHOOD | | | | SECOND LIKELIHOOD |
|---|---|---|---|---|---|
| | CIRCLE | RECTANGLE | DATABASE | ... | |
| 0 | 1.0 | 0.3 | 0.0 | | 1.0 |
| 0, 1 | 0.0 | 0.3 | 0.3 | | 0.8 |
| 0, 1, 2 | 0.0 | 0.3 | 0.8 | | 0.8 |

| COMBINATION OF STROKES | FIRST LIKELIHOOD | | | | SECOND LIKELIHOOD |
|---|---|---|---|---|---|
| | CIRCLE | RECTANGLE | OUTLINEARROW | ... | |
| 0 | 0.1 | 0.3 | 0.2 | | 1.0 |
| 0, 1 | 0.0 | 0.7 | 0.3 | | 0.8 |
| 0, 1, 2 | 0.0 | 0.3 | 0.6 | | 0.8 |
| 0, 1, 2, 3 | 0.0 | 0.2 | 0.7 | | 0.0 |

SHAPING DEVICE

CROSS-REFERENCE TO RELATED APPLICATION

This application is based upon and claims the benefit of priority from Japanese Patent Application No. 2013-062970, filed on Mar. 25, 2013; the entire contents of which are incorporated herein by reference.

FIELD

Embodiments described herein relate generally to a shaping device.

BACKGROUND

Technologies for shaping strokes of handwriting input by a user into graphic data are known.

With the technologies of the related art as mentioned above, however, erroneous shaping is likely to occur when a graphic to be shaped into is expressed by using another graphic as part thereof. An object to be achieved by the present invention is to provide a shaping device capable of increasing the accuracy of shaping into a target graphic expressed by using another graphic as part thereof.

DETAILED DESCRIPTION

According to an embodiment, a shaping device includes an acquiring unit, an extracting unit, a first calculator, a second calculator, a determining unit, a shaping unit, and a display unit. The acquiring unit is configured to acquire a plurality of strokes indicative of handwriting by a user. The extracting unit is configured to extract multiple combinations of strokes, each combination including one or more of the strokes. The first calculator is configured to calculate a first likelihood representing a probability that each of the combinations related a target graphic. The second calculator is configured to calculate a second likelihood representing a probability that each of the combinations related to an incomplete shape. The determining unit is configured to determine whether there is a first combination having at least one of first likelihoods equal to or higher than a first threshold and the second likelihood equal to or lower than a second threshold in the combinations. The shaping unit is configured to shape the strokes into the target graphic having the first likelihood equal to or higher than the first threshold for the first combination when there is the first combination. The display unit is configured to display a result of shaping the strokes.

Embodiments will be described below in detail with reference to the accompanying drawings.

First Embodiment

Figure 1:
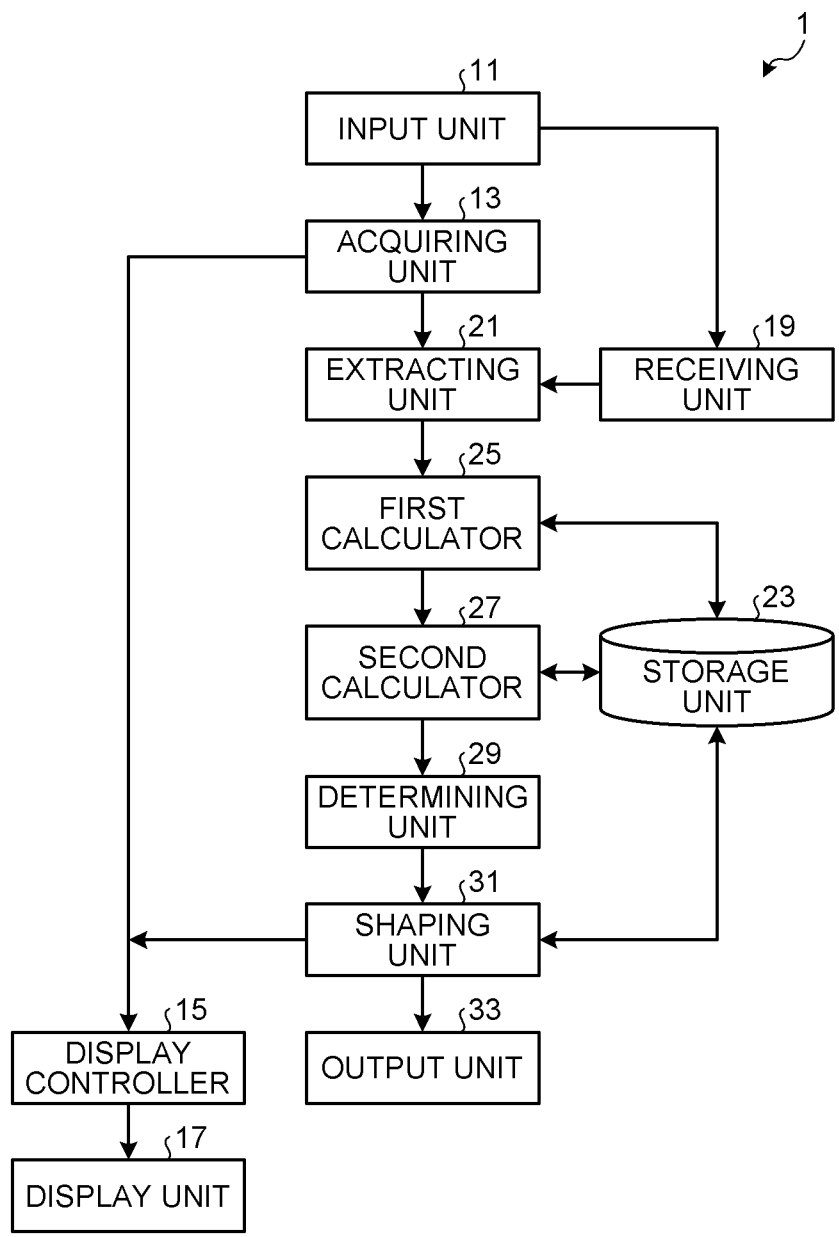
FIG. 1 is a configuration diagram illustrating an example of a shaping device according to a first embodiment.

FIG. 1 is a configuration diagram illustrating an example of a shaping device 1 according to a first embodiment. As illustrated in FIG. 1, the shaping device 1 includes an input unit 11, an acquiring unit 13, a display controller 15, a display unit 17, a receiving unit 19, an extracting unit 21, a storage unit 23, a first calculator 25, a second calculator 27, a determining unit 29, a shaping unit 31, and an output unit 33.

The input unit 11 can be realized with an input device allowing handwritten input such as a touch panel, a touch pad, a mouse, and an electronic pen.

The acquiring unit 13, the display controller 15, the receiving unit 19, the extracting unit 21, the first calculator 25, the second calculator 27, the determining unit 29, the shaping unit 31, and the output unit 33 may be implemented by making a processor such as a central processing unit (CPU) execute a program, that is, by software, may be implemented by hardware such as an integrated circuit (IC), or may be implemented by combination of software and hardware, for example.

The display unit 17 can be realized with a display device such as a touch panel display or a liquid crystal display, for example.

The storage unit 23 stores various programs to be executed by the shaping device 1 and data used for various processes performed by the shaping device 1. The storage unit 23 can be realized by a storage device that can magnetically, optically or electrically store information such as a hard disk drive (HDD), a solid state drive (SSD), a memory card, an optical disk, a read only memory (ROM), or a random access memory (RAM), for example.

The input unit 11 inputs a plurality of strokes (hereinafter may also be referred to as "handwritten data") by which the user has drawn a graphic or the like by handwriting to the shaping device 1. In the first embodiment, it is assumed that the input unit 11 is a touch panel and that the user inputs a plurality of strokes by handwriting a graphic or the like on the touch panel with a stylus pen or a finger, but the input unit 11 is not limited thereto. For example, the input unit 11 may be realized with a touch pad, a mouse or an electronic pen.

A stroke is data representing one unit of a graphic or the like handwritten by the user, that is, a trajectory of a stylus pen or a finger from where the pen or the finger touches an input face of the touch panel until where the pen or the finger gets away therefrom (from pen down to pen up). A stroke is expressed as time series coordinate values of a contact point of the stylus pen or the finger with the input face like $\{(x_1, y_1), (x_2, y_2), \ldots, (x_n, y_n)\}$, for example. The expression of a stroke, however, is not limited thereto.

The input unit 11 also inputs various instructions such as an instruction to shape input strokes and an instruction to output a file of shaped data resulting from shaping strokes to the shaping device 1.

Although it is assumed in the present embodiment that the input unit 11 also inputs these various instructions, but the manner in which various instructions are input is not limited thereto. For example, the shaping device 1 may further include an input unit such as an operator different from the input unit 11 and this input unit may input various instructions mentioned above.

The acquiring unit 13 acquires a plurality of strokes input by the input unit 11. Specifically, the acquiring unit 13 acquires the strokes by sequentially acquiring the strokes input by the input unit 11.

The display controller 15 displays the strokes acquired by the acquiring unit 13 on the display unit 17 and displays a result of shaping the strokes on the display unit 17. For example, the display controller 15 linearly compensates coordinate values of the strokes acquired by the acquiring unit 13 and displays the resulting strokes on the display unit 17. Although it is assumed in the present embodiment that the display unit 17 is realized with the same touch panel as the input unit 11, the display unit 17 is not limited thereto and may be realized with a touch panel different from that of the input unit 11 or with a liquid crystal display or the like.

Figures 2, 3:
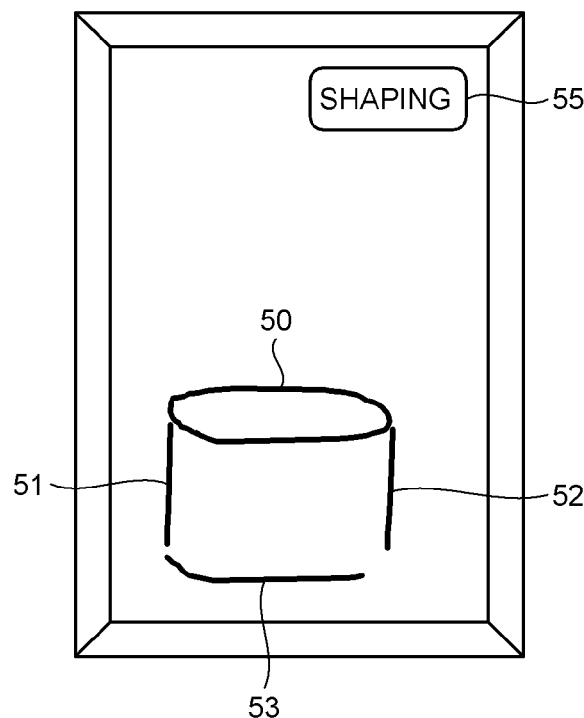
FIG. 2 is a diagram illustrating an example of display of a plurality of strokes according to the first embodiment.
FIG. 3 is an explanatory table of an example of a determination technique according to the first embodiment.

FIG. 2 is a diagram illustrating an example of display of a plurality of strokes according to the first embodiment. In the example illustrated in FIG. 2, strokes 50 to 53 expressing a graphic of a database are displayed on a display screen of the display unit 17. Note that the strokes 50 to 53 are assumed to be acquired (input) in the order of the stroke 50, the stroke 51, the stroke 52, and the stroke 53. Furthermore, a shaping button 55 is displayed on the display screen, and shaping of the strokes 50 to 53 is performed when the shaping button 55 is touched (selected) by the user. Note that the format in which a menu screen such as the shaping button 55 is displayed is not limited thereto, but various display formats such as icons or texts may be employed.

The receiving unit 19 receives various instructions such as a shaping instruction input by the input unit 11. For example, in the example illustrated in FIG. 2, when the shaping button 55 is touched, the input unit 11 inputs an instruction to shape the strokes 50 to 53 and the receiving unit 19 receives the shaping instruction.

The extracting unit 21 extracts multiple combinations of strokes, each combination including one or more of the strokes acquired by the acquiring unit 13. Specifically, when a shaping instruction is received by the receiving unit 19, the extracting unit 21 extracts multiple combinations of strokes from the strokes acquired by the acquiring unit 13, each combination including one or more of the strokes.

Note that combinations of strokes may be any combinations such as a combination of successive strokes, all combinations, and a combination of a leading stroke and strokes with median points with respect thereto within a predetermined distance. Although combinations of successive strokes (specifically, combinations of strokes generated each time a stroke is acquired (input) are used as the combinations of strokes in the first embodiment, the combinations are not limited thereto.

For example, in the case of the strokes 50 to 53 explained in FIG. 2, the extracting unit 21 extracts a combination including the stroke 50 generated as a result of acquisition (input) of the stroke 50, a combination including the strokes 50 and 51 generated as a result of acquisition (input) of the stroke 51, a combination of the strokes 50, 51, and 52 generated as a result of acquisition (input) of the stroke 52, and a combination including the strokes 50, 51, 52, and 53 generated as a result of acquisition (input) of the stroke 53 from the strokes 50 to 53.

The storage unit 23 stores multiple templates of target graphics (specifically, shaping target graphics), templates of incomplete shapes, and the like. Note that an incomplete shape is something uncompleted as a graphic and is assumed be something that becomes a complete graphic if one or more lines are additionally drawn in the first embodiment. For example, the storage unit 23 stores the number of strokes of a target graphic and time-series coordinate values composing the respective strokes in association with each other as a template of a target graphic or an incomplete shape.

The first calculator 25 calculates a first likelihood representing the probability that each of the combinations extracted by the extracting unit 21 corresponds to a target graphic for each of the target graphics. Specifically, the first calculator 25 compares each of the combinations extracted by the extracting unit 21 with each of the templates of target graphics stored in the storage unit 23 to calculate the first likelihood representing the probability that each of the combinations corresponds to the target graphic for each of the target graphics.

The calculation of the first likelihood can be performed by using a known technique. For example, the first calculator 25 obtains one combination extracted by the extracting unit 21, and extracts all the stroke strings each including K strokes with successive stroke numbers from the combination. If the number of strokes of the combination is N and K=3, the first calculator 25 extracts $(1, 2, 3), (2, 3, 4), \ldots, (N-2, N-1, N)$ as the stroke strings from the combination.

The first calculator 25 also obtains a template of a target graphic from the storage unit 23, and similarly extracts all the stroke strings each including K strokes with successive stroke numbers from the template of the target graphic.

The first calculator 25 then normalizes the positions and the sizes of the stroke strings of the combination and those of the stroke strings of the template of the target graphic to calculate the first likelihood. For example, point approximation is applied to each stroke using a certain number of points, the total of distances between corresponding points of the combination and the template is obtained as discrepancy, and the inverse thereof is obtained as the first likelihood.

Alternatively, for example, the first calculator 25 obtains one combination extracted by the extracting unit 21, extracts a feature quantity of the combination, and applies the extracted feature quantity to a discriminator that has learned to determine whether or not the feature quantity corresponds to a target graphic to calculate the first likelihood. Examples of the discriminator include a multi-class SVM disclosed in Crammer, K., & Singer, Y. (2001), On the algorithmic implementation of multi-class kernel-based vector machines, Machine Learning Research, 2, 265-292 and a KNN discriminator disclosed in JP-A 2009-20769 (KOKAI).

The second calculator 27 calculates a second likelihood representing the probability that each of the combinations extracted by the extracting unit 21 corresponds to an incomplete shape. Specifically, the second calculator 27 compares each of the combinations extracted by the extracting unit 21 with a template of an incomplete shape stored in the storage unit 23 to calculate the second likelihood representing the probability that each of the combinations corresponds to the incomplete shape.

The calculation of the second likelihood can also be performed by using a known technique. For example, the second likelihood can be calculated by replacing the target graphic with the incomplete shape in the techniques of calculating the first likelihood described above.

The determining unit 29 determines whether or not there is a first combination with at least one of first likelihoods equal to or higher than a first threshold and the second likelihood equal to or lower than a second threshold in the combinations extracted by the extracting unit 21.

FIG. 3 is an explanatory table of an example of the determination technique according to the first embodiment. In the example illustrated in FIG. 3, the first likelihood of each target graphic calculated by the first calculator 25 and the second likelihood calculated by the second calculator 27 are presented for each of the combinations of strokes extracted by the extracting unit 21.

Here, a combination (0) of strokes represents a combination including the stroke 50, a combination (0, 1) of strokes represents a combination including the strokes 50 and 51, a combination (0, 1, 2) of strokes represents a combination including the strokes 50, 51, and 52, and a combination (0, 1, 2, 3) of strokes represents a combination including the strokes 50, 51, 52, and 53. Furthermore, a circle, a rectangular, and a database are presented as examples of the target graphics. Furthermore, it is assumed that the first threshold is 0.7 and the second threshold is 0.3 in the example illustrated in FIG. 3, but the thresholds are not limited thereto.

In this case, combinations with at least one of the first likelihoods equal to or higher than 0.7 are the combination (0) and the combination (0, 1, 2, 3), and a combination with the second likelihood equal to or lower than 0.3 is the combination (0, 1, 2, 3). As a result, since the combination (0, 1, 2, 3) corresponds to the first combination, the determining unit 29 determines that there is a first combination.

If there is a first combination, the shaping unit 31 shapes the strokes acquired by the acquiring unit 13 into the target graphic with the first likelihood equal to or higher than the first threshold for the first combination. Specifically, if it is determined by the determining unit 29 that there are one or more first combinations, the shaping unit 31 shapes the strokes acquired by the acquiring unit 13 into the target graphic with the highest first likelihood for the one or more first combinations. More specifically, the shaping unit 31 acquires the template of the target graphic with the highest first likelihood for the one or more first combinations from the storage unit 23, and shapes the strokes acquired by the acquiring unit 13 by using the template.

Figure 4:
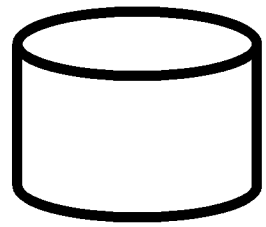
FIG. 4 is a diagram illustrating an example of a shaping result according to the first embodiment.

For example, in the example illustrated in FIG. 3, the highest first likelihood for the combination (0, 1, 2, 3) that is the one or more first combinations is 0.9 of the database. The shaping unit 31 thus acquires the template of the database from the storage unit 23, and shapes the strokes 50 to 53 into graphic data of the database as illustrated in FIG. 4 by using the template of the database.

The display controller 15 displays the result of shaping performed by the shaping unit 31 on the display unit 17 as described above.

The output unit 33 outputs the result of shaping performed by the shaping unit 31 in the form of a file, and stores the file of the shaping result in a storage unit or an external device (such as a cloud) that is not illustrated. Note that the shaping result may be put into the form of a file by the shaping unit 31 or by the output unit 33.

Figure 5:
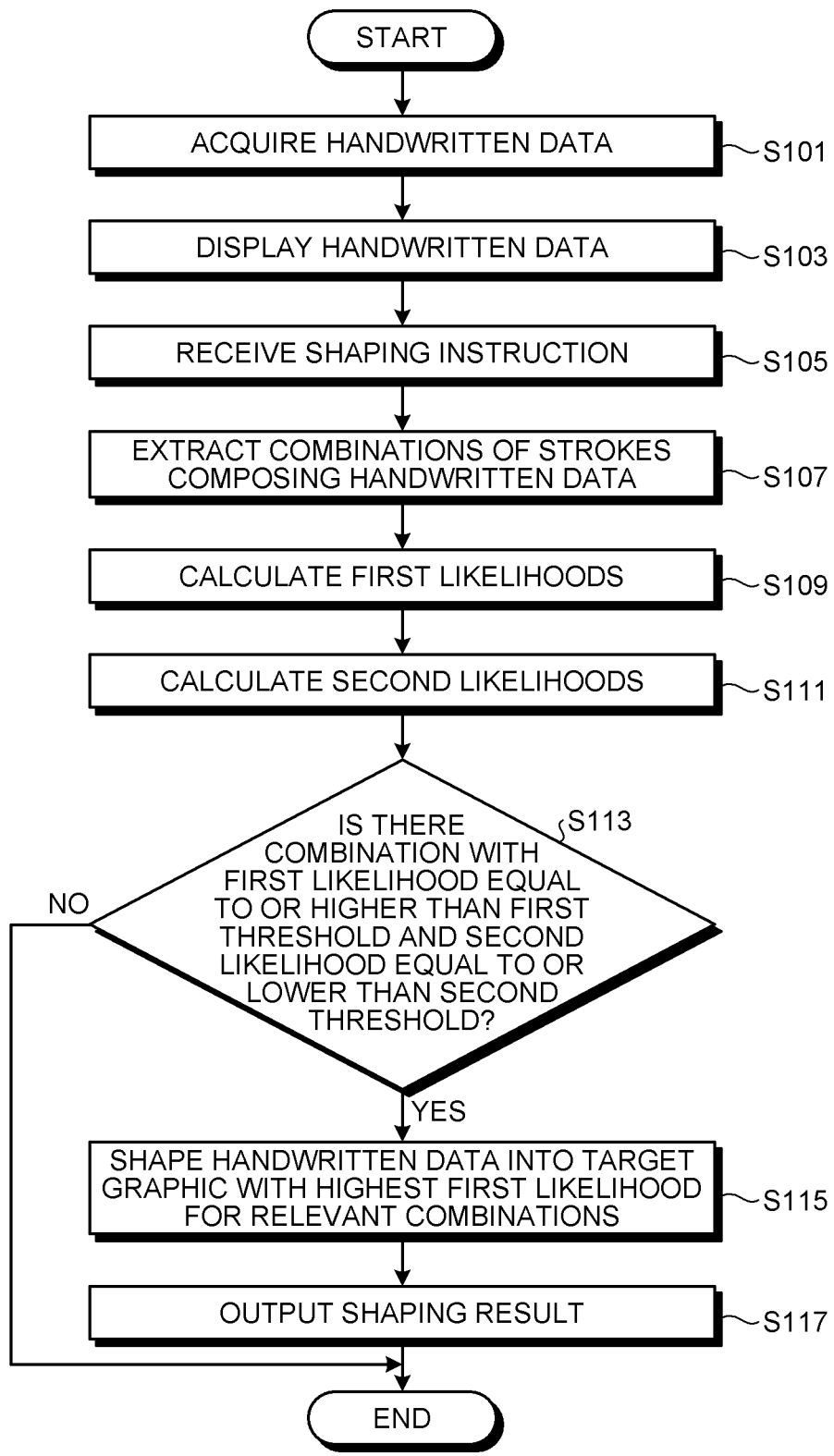
FIG. 5 is a flowchart illustrating an exemplary process according to the first embodiment.

FIG. 5 is a flowchart illustrating an example of a flow of procedures of processing performed by the shaping device 1 according to the first embodiment.

First, the acquiring unit 13 acquires handwritten data that is a plurality of strokes input by the input unit 11 (step S101).

Subsequently, the display controller 15 displays the handwritten data acquired by the acquiring unit 13 on the display unit 17 (step S103).

Subsequently, the receiving unit 19 receives a shaping instruction input by the input unit 11 (step S105).

Subsequently, the extracting unit 21 extracts multiple combinations of strokes, each combination including one or more of the strokes composing the handwritten data acquired by the acquiring unit 13 (step S107).

Subsequently, the first calculator 25 calculates a first likelihood representing the probability that each of the combinations extracted by the extracting unit 21 corresponds to a target graphic for each of the target graphics (step S109).

Subsequently, the second calculator 27 calculates a second likelihood representing the probability that each of the combinations extracted by the extracting unit 21 corresponds to an incomplete shape (step S111).

Subsequently, the determining unit 29 determines whether or not there is a first combination with at least one of first likelihoods equal to or higher than the first threshold and the second likelihood equal to or lower than the second threshold in the combinations extracted by the extracting unit 21 (step S113).

If there is a first combination (Yes in step S113), the shaping unit 31 shapes the handwritten data that is the strokes acquired by the acquiring unit 13 into the target graphic with the highest first likelihood for the one or more first combinations (step S115).

Subsequently, the display controller 15 displays the result of shaping performed by the shaping unit 31 on the display unit 17, and the output unit 33 outputs the result of shaping performed by the shaping unit 31 in the form of a file (step S117).

Although the processing is terminated if there is no first combination (No in step S113) in the example illustrated in FIG. 5, the processing is not limited thereto.

For example, if there is no combination with at least one of the first likelihoods equal to or higher than the first threshold in the combinations extracted by the extracting unit 21 in step S113, the strokes that are the handwritten data displayed on the display unit 17 may be deleted.

Alternatively, for example, if there is a combination with at least one of the first likelihoods equal to or higher than the first threshold but there is no combination with the second likelihood equal to or lower than the second threshold in the combinations extracted by the extracting unit 21 in step S113, the shaping unit 31 may shape the handwritten data into the target graphic with the highest first likelihood.

According to the first embodiment as described above, since it is possible to shape a plurality of strokes into a target graphic taking the probability of being an incomplete shape into account in addition to the probability of being a target graphic, the accuracy of shaping into a target graphic can be increased even when the target graphic is expressed another graphic as part thereof.

Second Embodiment

In a second embodiment, an example in which acquired strokes can be shaped into a target graphic even when the strokes are insufficient for the target graphic will be described. In the following, the difference from the first embodiment will be mainly described, components having similar functions as in the first embodiment will be designated by the same names and reference numerals as in the first embodiment, and the description thereof will not be repeated.

Figure 6:
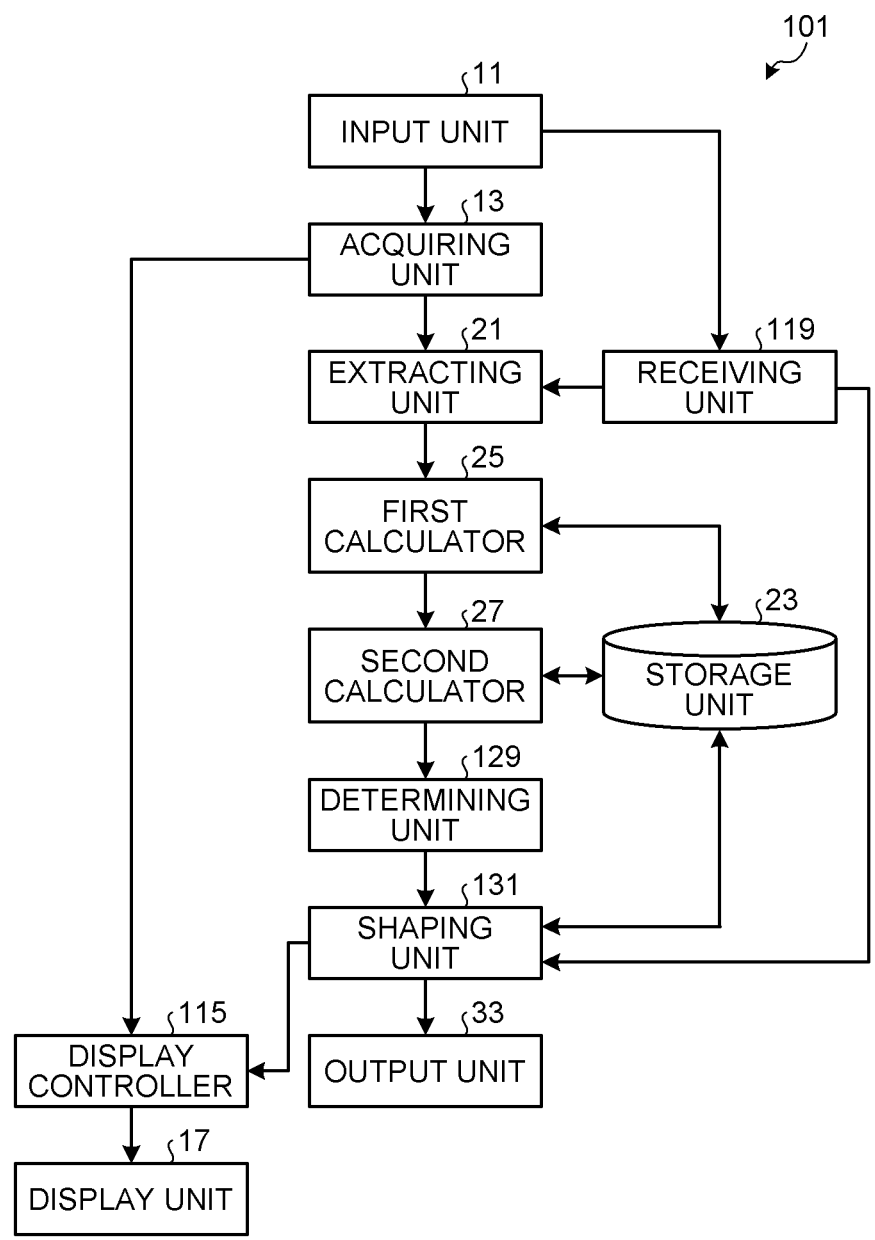
FIG. 6 is a configuration diagram illustrating an example of a shaping device according to a second embodiment.

FIG. 6 is a configuration diagram illustrating an example of a shaping device 101 according to the second embodiment. As illustrated in FIG. 6, the shaping device 101 of the second embodiment is different from that of the first embodiment in a determining unit 129, a display controller 115, a receiving unit 119, and a shaping unit 131.

Figures 7, 8:
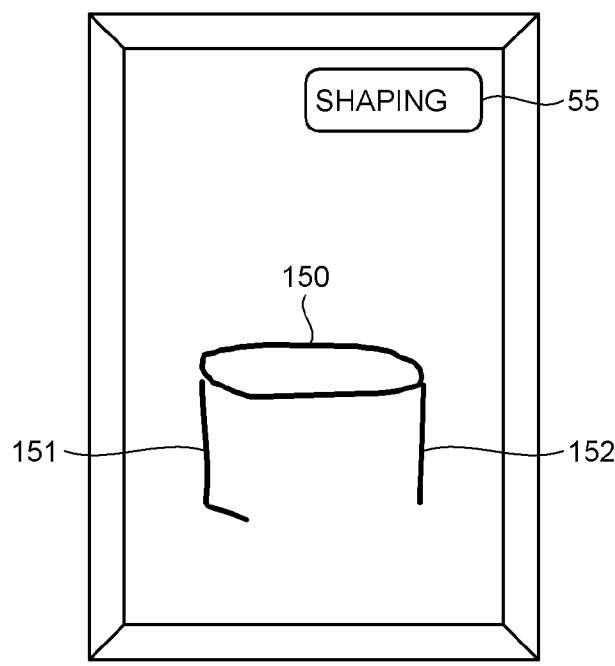
FIG. 7 is a diagram illustrating an example of display of a plurality of strokes according to the second embodiment.
FIG. 8 is an explanatory table of an example of a determination technique according to the second embodiment.

FIG. 7 is a diagram illustrating an example of display of a plurality of strokes according to the second embodiment. In the example illustrated in FIG. 7, strokes 150 to 152 expressing a graphic of a database are displayed on a display screen of the display unit 17. With the strokes 150 to 152, however, the database is not properly expressed since some strokes are missing. Note that the strokes 150 to 152 are assumed to be acquired (input) in the order of the stroke 150, the stroke 151, and the stroke 152.

If there is no first combination, the determining unit 129 further determines whether or not there is a second combination with at least one of the first likelihoods equal to or higher than the first threshold and the second likelihood equal to or lower than a third threshold that is larger than the second threshold.

FIG. 8 is an explanatory table of an example of the determination technique according to the second embodiment. Here, a combination (0) of strokes represents a combination including the stroke 150, a combination (0, 1) of strokes represents a combination including the strokes 150 and 151, and a combination (0, 1, 2) of strokes represents a combination including the strokes 150, 151, and 152. Furthermore, it is assumed that the first threshold is 0.7, the second threshold is 0.3, and the third threshold is 0.9 in the example illustrated in FIG. 8, but the thresholds are not limited thereto.

In this case, combinations with at least one of the first likelihoods equal to or higher than 0.7 are the combination (0) and the combination (0, 1, 2), there is no combination with the second likelihood equal to or lower than 0.3, and a combination with the second likelihood equal to or lower than 0.9 is the combination (0, 1, 2). As a result, since there is no combination corresponding to the first combination and the combination (0, 1, 2) corresponds to the second combination, the determining unit 129 determines that there is no first combination and that there is a second combination.

If it is determined by the determining unit 129 that there are one or more second combinations, the display controller 115 displays the target graphic with the highest first likelihood for the one or more second combinations as a shaping candidate on the display unit 17.

For example, in the example illustrated in FIG. 8, the highest first likelihood for the combination (0, 1, 2) that is the one or more second combinations is 0.8 of the database. The display controller 115 thus acquires the template of the database from the shaping unit 131 or the storage unit 23, and displays the database 156 as the shaping candidate on a display screen of the display unit 17 as illustrated in FIG. 9.

Figure 9:
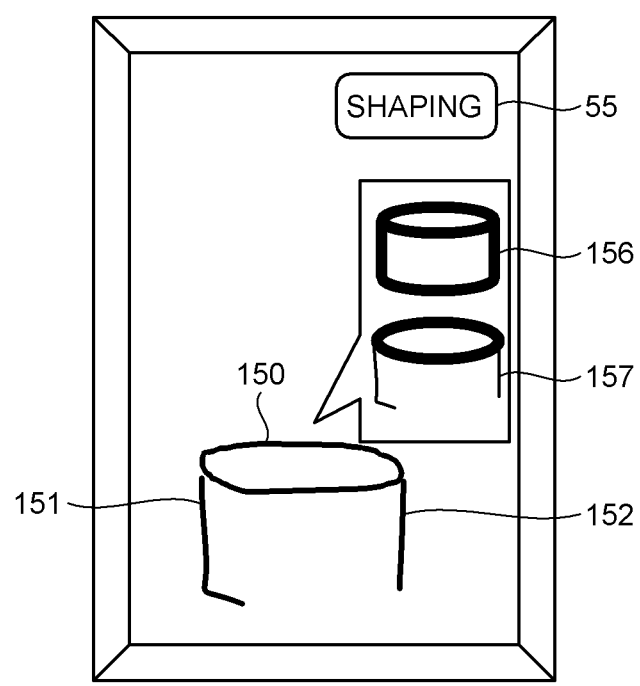
FIG. 9 is a diagram illustrating an example of display of shaping candidates according to the second embodiment.

In the example illustrated in FIG. 9, however, the display controller 115 also displays a graphic 157 corresponding to the combination (0, 1, 2) as a shaping candidate on the display screen of the display unit 17. This is because there is a possibility that the shape of the last combination (0, 1, 2) of strokes may be what is intended and handwritten by the user rather than that the combination (0, 1, 2) results from insufficient strokes for the database.

In the example illustrated in FIG. 9, however, the display controller 115 displays the graphic 157 as a shaping candidate with a lower priority than the database 156.

The receiving unit 119 receives input of an instruction to select a shaping candidate input by the input unit 11. For example, if the database 156 is touched in the example illustrated in FIG. 9, the input unit 11 inputs an instruction to select the database 156 and the receiving unit 119 receives the selection instruction. Alternatively, for example, if the graphic 157 is touched in the example illustrated in FIG. 9, the input unit 11 inputs an instruction to select the graphic 157 and the receiving unit 119 receives the selection instruction.

When a selection instruction is received by the receiving unit 119, the shaping unit 131 shapes the strokes acquired by the acquiring unit 13 into a target graphic that is the selected shaping candidate. For example, if the instruction to select the database 156 is received by the receiving unit 119 in the example illustrated in FIG. 9, the shaping unit 131 shapes the strokes 150 to 152 into graphic data of the database as illustrated in FIG. 4. Alternatively, for example, if the instruction to select the graphic 157 is received by the receiving unit 119 in the example illustrated in FIG. 9, the shaping unit 131 shapes the strokes 150 to 152 into graphic data of the graphic 157.

The display controller 115 then displays the result of shaping performed by the shaping unit 131 on the display unit 17, and the output unit 33 outputs the result of shaping performed by the shaping unit 131 in the form of a file.

Figure 10:
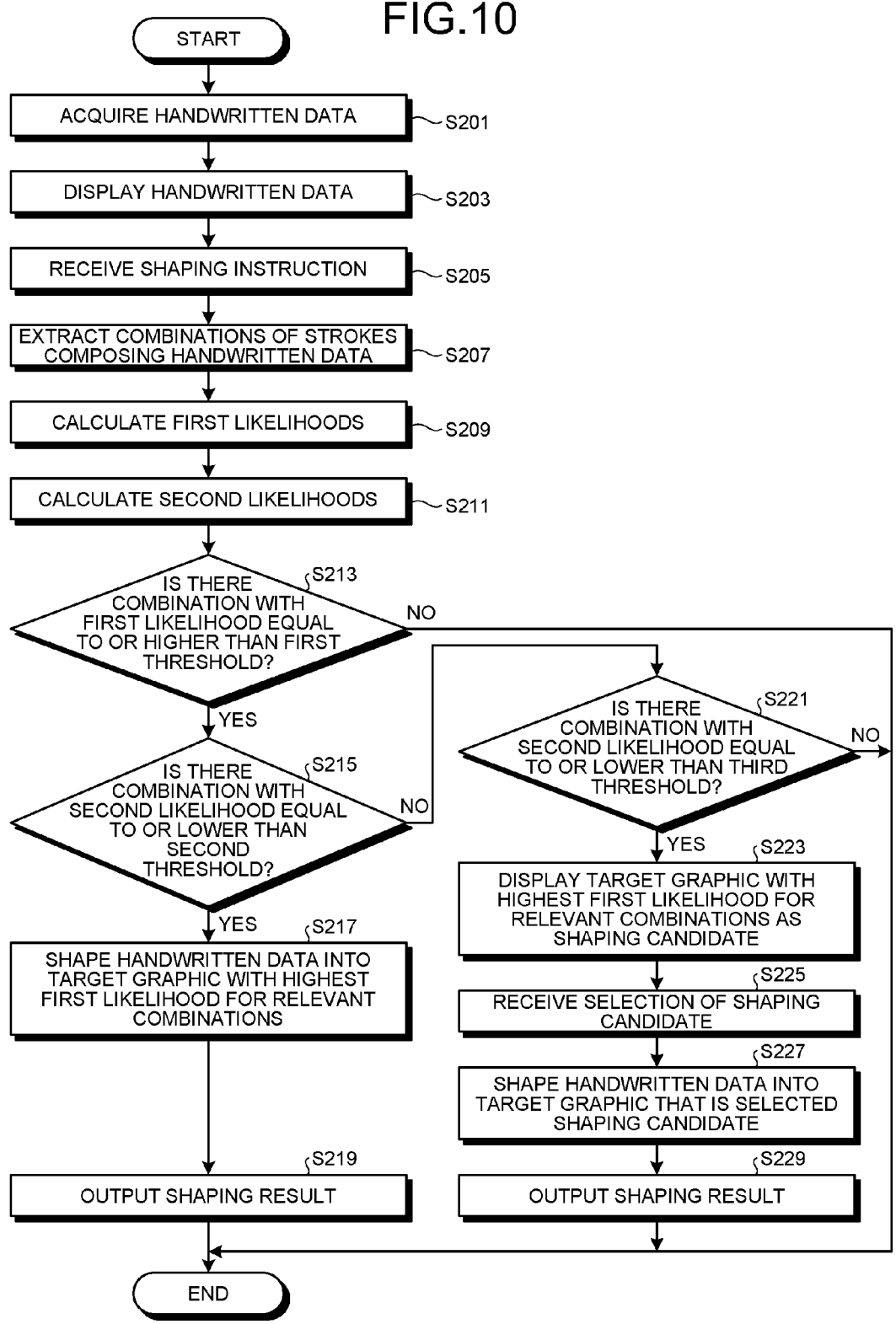
FIG. 10 is a flowchart illustrating an exemplary process according to the second embodiment.

FIG. 10 is a flowchart illustrating an example of a flow of procedures of processing performed by the shaping device 101 according to the second embodiment.

First, the processing in steps S201 to S211 is the same as that in steps S101 to S111 in the flowchart of FIG. 5.

Subsequently, the determining unit 129 determines whether or not there is a combination with at least one of first likelihoods equal to or higher than the first threshold in the combinations extracted by the extracting unit 21 (step S213).

If there is a combination with at least one of first likelihoods equal to or higher than the first threshold (Yes in step S213), the determining unit 129 determines whether or not a combination (first combination) with the second likelihood equal to or lower than the second threshold in such combinations (step S215).

If there is a first combination (Yes in step S215), the shaping unit 131 shapes the handwritten data that is the strokes acquired by the acquiring unit 13 into the target graphic with the highest first likelihood for the one or more first combinations (step S217).

Subsequently, the display controller 115 displays the result of shaping performed by the shaping unit 131 on the display unit 17, and the output unit 33 outputs the result of shaping performed by the shaping unit 131 in the form of a file (step S219).

If, on the other hand, there is no first combination (No in step S215), the determining unit 129 determines whether or not there is a combination (second combination) with the second likelihood equal to or lower than the third threshold in the combinations (step S221).

If there is a second combination (Yes in step S221), the display controller 115 displays the target graphic with the highest first likelihood in the one or more second combinations as a shaping candidate (step S223).

Subsequently, the receiving unit 119 receives input of an instruction to select a shaping candidate input by the input unit 11 (step S225).

Subsequently, when a selection instruction is received by the receiving unit 119, the shaping unit 131 shapes the handwritten data that is the strokes acquired by the acquiring unit 13 into a target graphic that is the selected shaping candidate (step S227).

Subsequently, the display controller 115 displays the result of shaping performed by the shaping unit 131 on the display unit 17, and the output unit 33 outputs the result of shaping performed by the shaping unit 131 in the form of a file (step S229).

Note that, if there is no combination with at least one of the first likelihoods equal to or higher than the first threshold in the combinations extracted by the extracting unit 21 in step S213, the strokes that are the handwritten data displayed on the display unit 17 may be deleted.

Alternatively, for example, if there is a combination with at least one of the first likelihoods equal to or higher than the first threshold but there is no combination with the second likelihood equal to or lower than the third threshold in the combinations extracted by the extracting unit 21 in step S221, the shaping unit 131 may shape the handwritten data into the target graphic with the highest first likelihood.

According to the second embodiment as described above, it is possible to obtain a target graphic as a shaping candidate even for strokes insufficient for the target graphic by relaxing the criterion for determining the probability of being an incomplete shape and shape the strokes into the target graphic.

Third Embodiment

In a third embodiment, an example in which it is checked with the user whether or not to perform shaping when strokes are insufficient for a target graphic will be described. In the following, the difference from the second embodiment will be mainly described, components having similar functions as in the second embodiment will be designated by the same names and reference numerals as in the second embodiment, and the description thereof will not be repeated.

Figure 11:
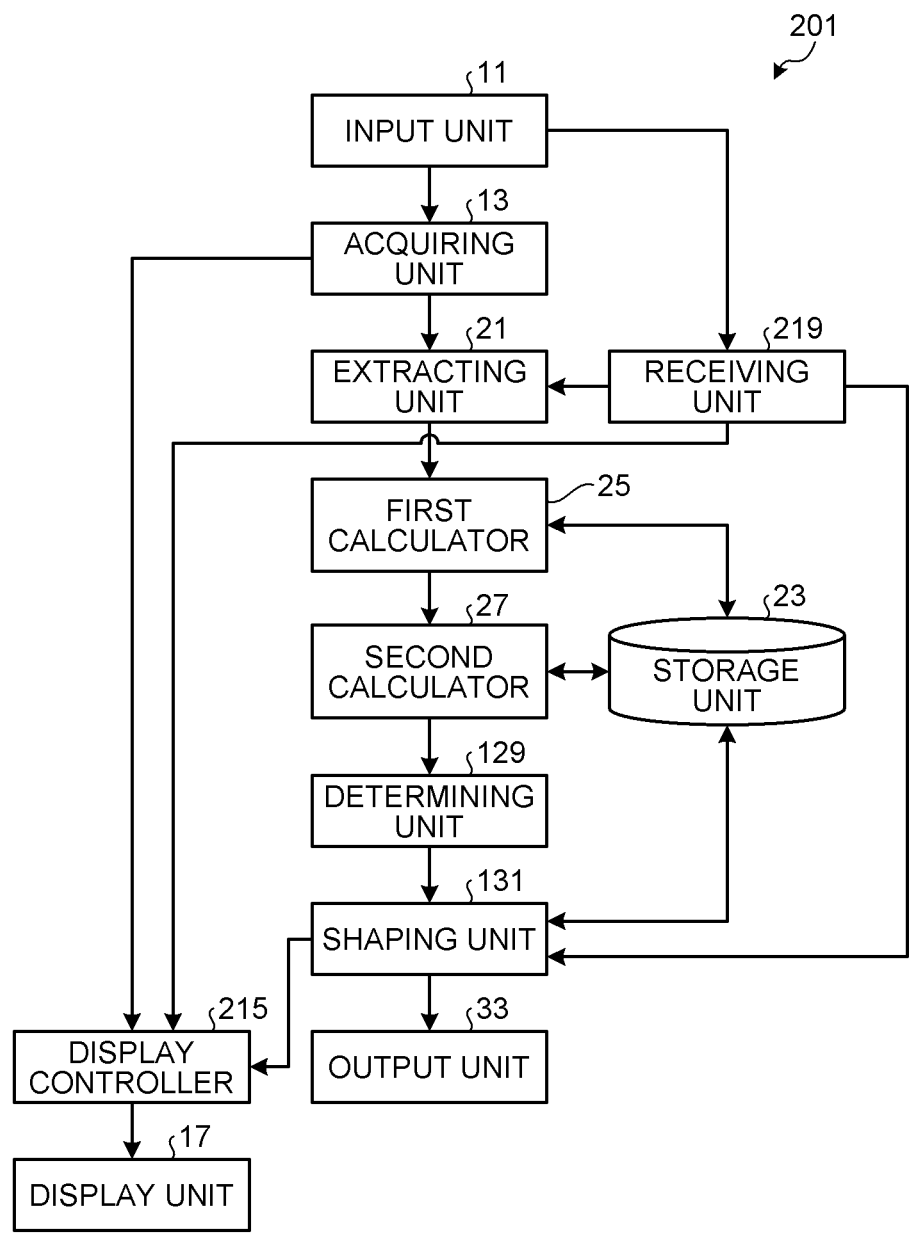
FIG. 11 is a configuration diagram illustrating an example of a shaping device according to a third embodiment.

FIG. 11 is a configuration diagram illustrating an example of a shaping device 201 according to the third embodiment. As illustrated in FIG. 11, the shaping device 201 of the third embodiment is different from that of the second embodiment in a display controller 215 and a receiving unit 219.

Figure 12:
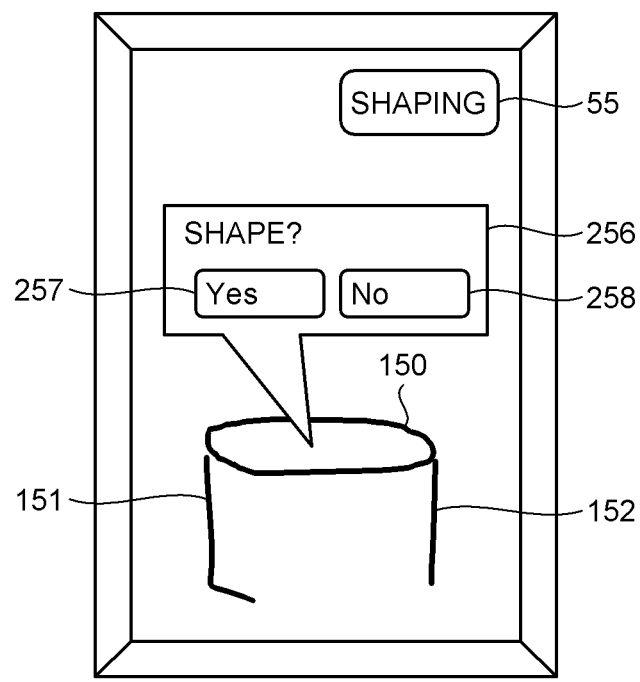
FIG. 12 is a diagram illustrating an example of display of a screen for confirmation according to the third embodiment.

If it is determined by the determining unit 129 that there are one or more second combinations, the display controller 215 displays a confirmation screen for checking whether or not to perform shaping on the display unit 17. For example, the display controller 215 displays a confirmation screen 256 for checking whether or not to perform shaping on a display screen of the display unit 17 as illustrated in FIG. 12.

The receiving unit 219 receives input of a check instruction to check whether or not to perform shaping input by the input unit 11. For example, if a Yes button 257 is touched in the example illustrated in FIG. 12, the input unit 11 inputs a check instruction instructing that shaping is to be performed and the receiving unit 219 receives the check instruction. If, for example, a No button 258 is touched in the example illustrated in FIG. 12, the input unit 11 inputs a check instruction instructing that shaping is not to be performed and the receiving unit 219 receives the check instruction.

If the check instruction instructing that shaping is to be performed is received by the receiving unit 219, the display controller 215 displays a target graphic with the highest first likelihood for one or more second combination as a shaping candidate on the display unit 17.

Fourth Embodiment

In a fourth embodiment, an example in which acquired strokes can be shaped into a target graphic even when the strokes are excessive for the target graphic will be described. In the following, the difference from the first embodiment will be mainly described, components having similar functions as in the first embodiment will be designated by the same names and reference numerals as in the first embodiment, and the description thereof will not be repeated.

Figure 13:
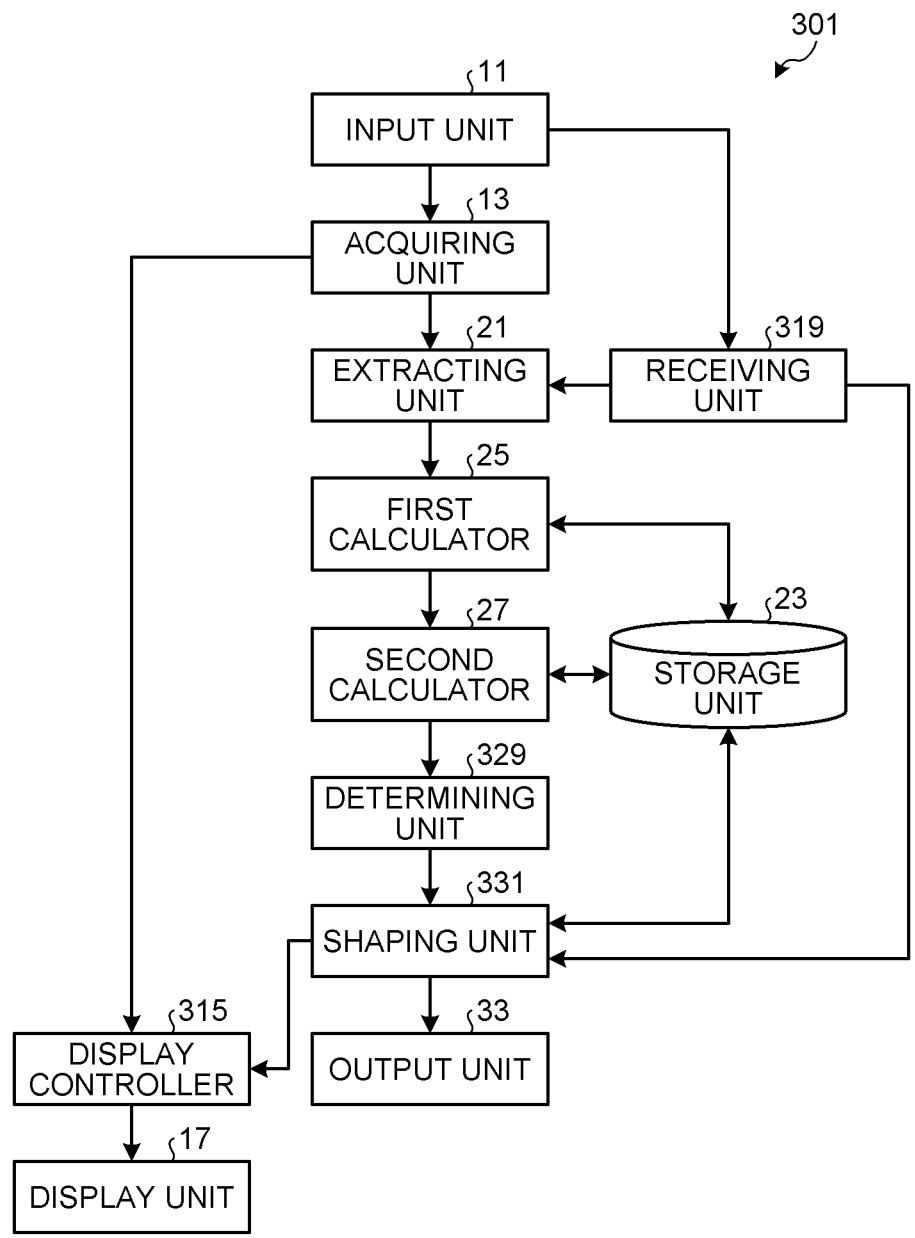
FIG. 13 is a configuration diagram illustrating an example of a shaping device according to a fourth embodiment.

FIG. 13 is a configuration diagram illustrating an example of a shaping device 301 according to the fourth embodiment. As illustrated in FIG. 13, the shaping device 301 of the fourth embodiment is different from that of the first embodiment in a determining unit 329, a display controller 315, a receiving unit 319, and a shaping unit 331.

Figures 14, 15:
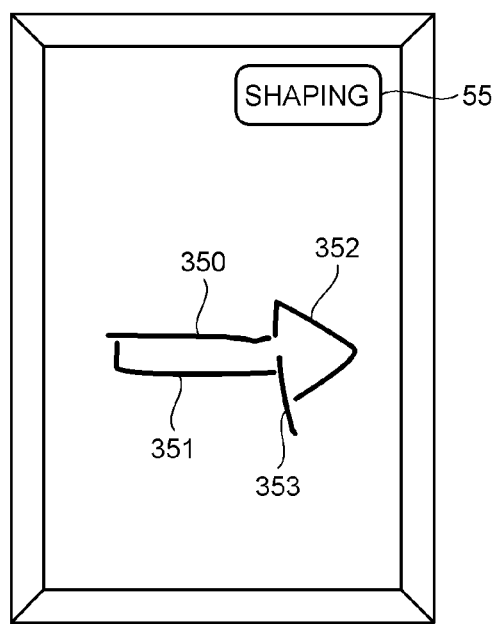
FIG. 14 is a diagram illustrating an example of display of a plurality of strokes according to the fourth embodiment.
FIG. 15 is an explanatory table of an example of a determination technique according to the fourth embodiment.

FIG. 14 is a diagram illustrating an example of display of a plurality of strokes according to the fourth embodiment. In the example illustrated in FIG. 14, strokes 350 to 353 expressing a graphic of an arrow are displayed on a display screen of the display unit 17. With the strokes 350 to 353, however, the arrow is not properly expressed since the stroke 353 sticks out (is too long). Note that the strokes 350 to 353 are assumed to be acquired (input) in the order of the stroke 350, the stroke 351, the stroke 352, and the stroke 353.

If there is no combination with at least one of the first likelihoods equal to or higher than the first threshold in the combinations extracted by the extracting unit 21, the determining unit 329 further determines whether or not there is a third combination with at least one of the first likelihoods equal to or higher than a fourth threshold that is smaller than the first threshold and the second likelihood equal to or lower than the second threshold.

FIG. 15 is an explanatory table of an example of the determination technique according to the fourth embodiment. Here, a combination (0) of strokes represents a combination including the stroke 350, a combination (0, 1) of strokes represents a combination including the strokes 350 and 351, a combination (0, 1, 2) of strokes represents a combination including the strokes 350, 351, and 352, and a combination (0, 1, 2, 3) of strokes represents a combination including the strokes 350, 351, 352, and 353. Furthermore, it is assumed that the first threshold is 0.8, the second threshold is 0.3, and the fourth threshold is 0.5 in the example illustrated in FIG. 15, but the thresholds are not limited thereto.

In this case, there is no combination with at least one of the first likelihoods equal to or higher than 0.8, combinations with at least one of the first likelihoods equal to or higher than 0.5 are the combination (0, 1), the combination (0, 1, 2), and the combination (0, 1, 2, 3), and a combination with the second likelihood equal to or lower than 0.3 is the combination (0, 1, 2, 3). As a result, since there is no combination corresponding to the first combination and the combination (0, 1, 2, 3) corresponds to the third combination, the determining unit 329 determines that there is no first combination and that there is a third combination.

If it is determined by the determining unit 329 that there are one or more third combinations, the display controller 315 displays the target graphic with the highest first likelihood for the one or more third combinations as a shaping candidate on the display unit 17. It is more preferable to display a target graphic with the highest first likelihood and the lowest second likelihood for the one or more third combinations as a shaping candidate on the display unit 17. This is because the second likelihood represents the probability of being an incomplete shape and a graphic with a lower second likelihood is likely to be a graphic of a shaping candidate.

For example, in the example illustrated in FIG. 15, the highest first likelihood for the combination (0, 1, 2, 3) that is the one or more third combinations is 0.7 of the arrow. The display controller 315 thus acquires the template of the arrow from the shaping unit 331 or the storage unit 23, and displays the arrow as a shaping candidate on a display screen of the display unit 17. Note that the display controller 315 may also display a graphic corresponding to the combination (0, 1, 2, 3) that is the last combination of strokes as a shaping candidate on the display screen of the display unit 17 similarly to the second embodiment.

The receiving unit 319 receives input of an instruction to select a shaping candidate input by the input unit 11.

Figure 16:
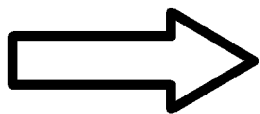
FIG. 16 is a diagram illustrating an example of a shaping result according to the fourth embodiment.

When a selection instruction is received by the receiving unit 319, the shaping unit 331 shapes the strokes acquired by the acquiring unit 13 into a target graphic that is the selected shaping candidate. For example, when an instruction to select the arrow is received by the receiving unit 319, the shaping unit 331 shapes the strokes 350 to 353 into the graphic data of the arrow as illustrated in FIG. 16.

The display controller 315 then displays the result of shaping performed by the shaping unit 331 on the display unit 17, and the output unit 33 outputs the result of shaping performed by the shaping unit 331 in the form of a file.

According to the fourth embodiment as described above, it is possible to obtain a target graphic as a shaping candidate even for strokes excessive for the target graphic by relaxing the criterion for determining the probability of being a target graphic and shape the strokes into the target graphic.

Note that modifications similar to those in the third embodiment may be made in the fourth embodiment. Specifically, if there are one or more third combinations, the display controller 315 may display a confirmation screen for checking whether or not to perform shaping on the display unit 17, the receiving unit 319 may further receive an input of a check instruction to check whether or not to perform shaping and, if a check instruction instructing that shaping is to be performed is received, the display controller 315 may display a target graphic with the highest first likelihood for the one or more third combinations as a shaping candidate on the display unit 17.

Fifth Embodiment

In a fifth embodiment, an example in which strokes are classified into two or more stroke groups and shaping is performed on each stroke group will be described. In the following, the difference from the second embodiment will be mainly described, components having similar functions as in the second embodiment will be designated by the same names and reference numerals as in the second embodiment, and the description thereof will not be repeated.

Figure 17:
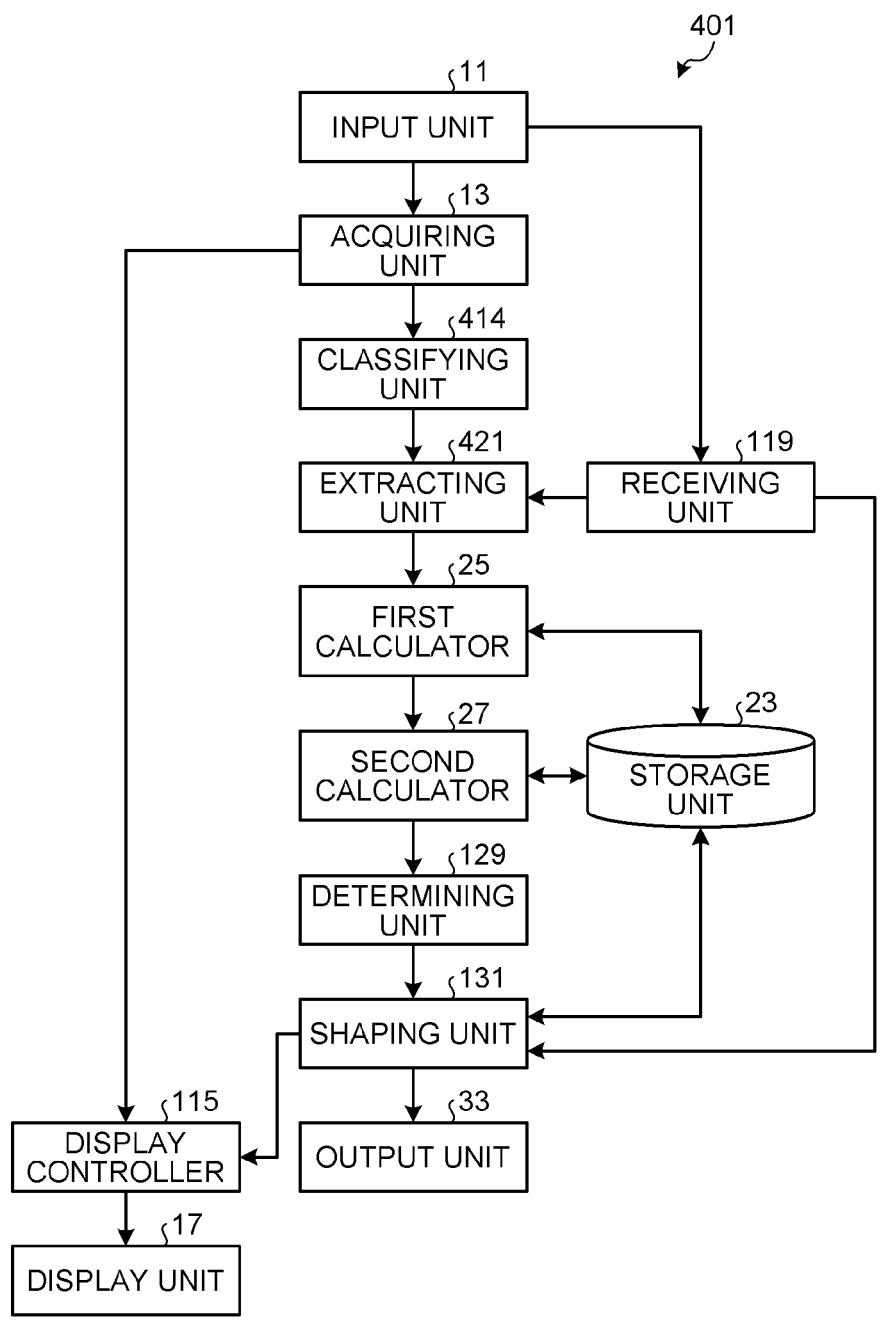
FIG. 17 is a configuration diagram illustrating an example of a shaping device according to a fifth embodiment.

FIG. 17 is a configuration diagram illustrating an example of a shaping device 401 according to the fifth embodiment. As illustrated in FIG. 17, the shaping device 401 of the fifth embodiment is different from that of the second embodiment in a classifying unit 414 and an extracting unit 421.

The classifying unit 414 classifies the strokes acquired by the acquiring unit 13 into two or more stroke groups. Specifically, the classifying unit 414 classifies the strokes acquired by the acquiring unit 13 into two or more stroke groups according to the respective positions thereof.

The classification of the strokes can be performed by using a known technique. For example, the classifying unit 414 classifies adjacent strokes or strokes with median points within a predetermined distance into the same stroke group. Alternatively, for example, the classifying unit 414 may calculate the likelihood for each of the acquired strokes, express the likelihoods in a Markov random field (MRF) so as to add spatial proximity and continuity on a coordinate plane, and estimate a plurality of divided regions into which a region where the handwritten data is present and which can be most easily separated (refer, for example, to Xiang-Dong Zhou, Cheng-Lin Liu, "Text/Non-text Ink Stroke Classification in Japanese Handwriting Based on Markov Random Fields," Document Analysis and Recognition, 2007, ICDAR 2007, Ninth International Conference on, 23-26 Sep. 2007).

The extracting unit 421 extracts multiple combinations of strokes from each of the stroke groups classified by the classifying unit 414, each combination including one or more strokes from the stroke group.

Subsequently, the first calculator 25, the second calculator 27, the determining unit 129, and the shaping unit 131 perform the processing described above on each stroke group.

Figure 18:
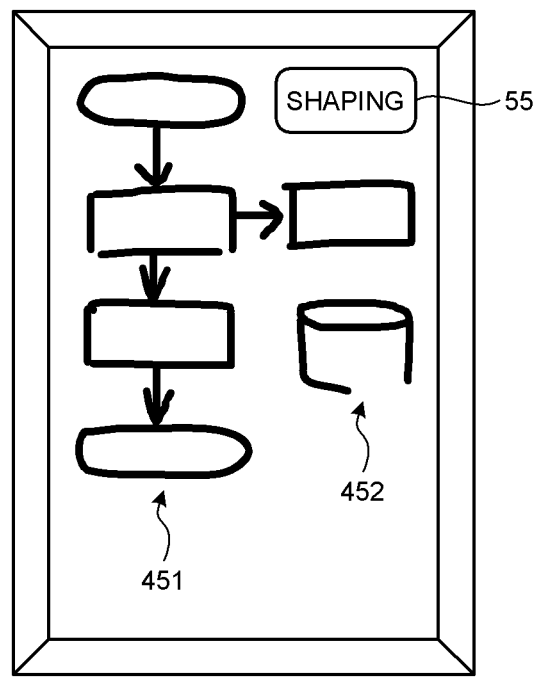
FIG. 18 is a diagram illustrating an example of display of a plurality of strokes according to the fifth embodiment.
Figure 19:
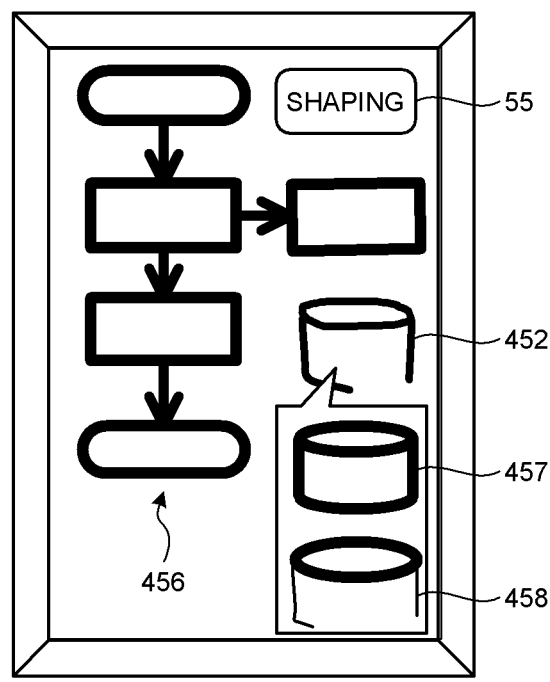
FIG. 19 is a diagram illustrating an example of a shaping result according to the fifth embodiment.

As a result, when a handwritten flowchart 451 and a handwritten database 452 are to be shaped as illustrated in FIG. 18, optimum shaping processing can be performed on each of the stroke groups such as shaping the handwritten flowchart 451 into a flowchart 456 while displaying shaping candidates 457 and 458 for the handwritten database 452 as illustrated in FIG. 19. In this example, the handwritten flowchart 451 corresponds to a first combination and the handwritten database 452 corresponds to a second combination.

Hardware Configuration

Figure 20:
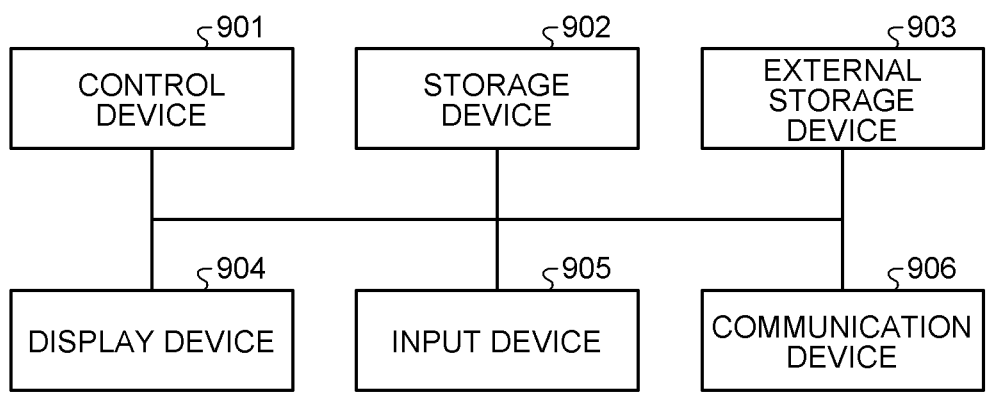
FIG. 20 is a diagram illustrating an exemplary hardware configuration of a shaping device according to the embodiments.

FIG. 20 is a diagram illustrating an example of a hardware configuration of the shaping device according to the embodiments described above. The shaping device according to the embodiments described above includes a control device 901 such as a CPU, a storage device 902 such as a ROM and a RAM, an external storage device 903 such as an HDD, a display device 904 such as a touch panel, an input device 905 such as a touch panel, and a communication device 906 such as a communication interface, which is a hardware configuration utilizing a common computer system.

Programs to be executed by the shaping device according to the embodiments described above are recorded on a computer readable recording medium such as a CD-ROM, a CD-R, a memory card, a digital versatile disk (DVD) and a flexible disk (FD) in a form of a file that can be installed or executed, and provided therefrom.

Alternatively, the programs to be executed by the shaping device according to the embodiments described above may be stored on a computer system connected to a network such as the Internet, and provided by being downloaded via the network. Still alternatively, the programs to be executed by the shaping device according to the embodiments described above may be provided or distributed through a network such as the Internet. Still alternatively, the programs to be executed by the shaping device according to the embodiments described above may be embedded in a ROM or the like in advance and provided therefrom.

The programs to be executed by the shaping device according to the embodiments described above have modular structures for implementing the components described above on a computer system. In an actual hardware configuration, the CPU reads programs from the HDD and executes the programs on the RAM, whereby the respective components described above are implemented on a computer system.

For example, the order in which the steps in the flowcharts in the embodiments described above are performed may be changed, a plurality of steps may be performed at the same time or the order in which the steps are performed may be changed each time the steps are performed to the extent that the changes are not inconsistent with the nature thereof.

As described above, according to the embodiments, the accuracy of shaping into a target graphic expressed by using another graphic as part thereof can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shaping device comprising:
   an acquiring unit configured to acquire a plurality of strokes indicative of handwriting by a user;
   an extracting unit configured to extract multiple combinations of strokes, each combination including one or more of the strokes;
   a first calculator configured to calculate a first likelihood representing a probability that each of the combinations related to a target graphic;
   a second calculator configured to calculate a second likelihood representing a probability that each of the combinations related to an incomplete shape;
   a determining unit configured to determine whether there is a first combination having at least one of first likelihoods equal to or higher than a first threshold and the second likelihood equal to or lower than a second threshold in the combinations;
   a shaping unit configured to shape the strokes into the target graphic having the first likelihood equal to or higher than the first threshold for the first combination when there is the first combination; and
   a display unit configured to display a result of shaping the strokes.

2. The device according to claim 1, wherein the shaping unit is configured to shape the strokes into a target graphic having a highest first likelihood when there are one or more first combinations.

3. The device according to claim 2, wherein
   the determining unit is further configured to determine whether there is a second combination having at least one of the first likelihoods equal to or higher than the first threshold and the second likelihood equal to or lower than a third threshold when there is no first combination, the third threshold being larger than the second threshold,
   the display unit is configured to display a target graphic having a highest first likelihood for one or more second combinations as a shaping candidate
   the shaping device further comprises a receiving unit configured to receive an instruction to select a shaping candidate,
   the shaping unit is configured to shape the strokes into a target graphic that is a selected shaping candidate in response to the selection instruction received, and
   the display unit is configured to display a result of shaping.

4. The device according to claim 3, wherein
   the display unit is configured to display a confirmation screen to check whether to perform shaping when there are one or more second combinations,
   the receiving unit is further configured to receive input of a check instruction to check whether to perform shaping, and
   the display unit is configured to display a target graphic having the highest likelihood for the one or more second combinations as a shaping candidate in response to a check instruction instructing that shaping is to be performed.

5. The device according to claim 2, wherein
   the determining unit is further configured to determine whether there is a third combination having at least one of the first likelihoods equal to or higher than a fourth threshold and the second likelihood equal to or lower than the second threshold when there is no combination having at least one of the first likelihoods equal to or higher than the first threshold, the fourth threshold being smaller than the first threshold,
   the display unit is configured to display a target graphic having a highest first likelihood for one or more third combinations as a shaping candidate,
   the shaping device further comprises a receiving unit configured to receive an instruction to select a shaping candidate,
   the shaping unit is configured to shape the strokes into a target graphic that is a selected shaping candidate in response to the selection instruction received, and
   the display unit is configured to display a result of shaping.

6. The device according to claim 5, wherein
   the display unit is configured to display a confirmation screen to check whether to perform shaping when there are the one or more third combinations,
   the receiving unit is further configured to receive input of a check instruction to check whether to perform shaping, and
   the display unit is configured to display a target graphic having a highest likelihood for the one or more third combinations as a shaping candidate in response to the check instruction instructing that shaping is to be performed.

7. The device according to claim 1, further comprising a classifying unit configured to classify the strokes into two or more stroke groups, wherein
   the extracting unit is configured to extract multiple combinations of strokes from each of the stroke groups, each combination including one or more strokes in the stroke group.

8. The device according to claim 7, wherein the classifying unit is configured to classify the strokes into the two or more stroke groups according to respective positions of the strokes.

9. A shaping device comprising:
   an acquiring unit configured to acquire a plurality of strokes handwritten by a user; and
   a display unit configured to display a result of shaping the strokes into a target shape when there is a combination having a first likelihood representing a probability that the combination related to the target graphic equal to or higher than a first threshold and a second likelihood representing a probability that the combination related to an incomplete shape equal to or lower than a second threshold in multiple combinations, the combination being one of multiple combinations of strokes, each combination including one or more of the strokes.

* * * * *